United States Patent [19]

Tsunoda et al.

[11] Patent Number: 4,774,672
[45] Date of Patent: Sep. 27, 1988

[54] NAVIGATION SYSTEM FOR AUTOMOTIVE VEHICLE INCLUDING FEATURE OF UPDATING VEHICLE POSITION AT SELECTED POINTS ALONG PRESET COURSE

[75] Inventors: Masakazu Tsunoda, Fujisawa; Seiichi Tohjyo, Zama; Yasushi Kawakami, Tokyo, all of Japan

[73] Assignee: Nissan Motor Company, Limited, Kanagawa, Japan

[21] Appl. No.: 838,301

[22] Filed: Mar. 10, 1986

[30] Foreign Application Priority Data

Mar. 11, 1985 [JP] Japan .................................. 60-47877

[51] Int. Cl.$^4$ ............................................. G06F 15/50
[52] U.S. Cl. .................................. 364/449; 364/444; 340/988; 340/995
[58] Field of Search ............... 364/443, 444, 449, 460, 364/521, 571; 73/178 R; 342/450, 451; 340/988, 990, 995

[56] References Cited

U.S. PATENT DOCUMENTS

| | | | |
|---|---|---|---|
| 4,490,717 | 12/1984 | Saito | 340/995 |
| 4,511,973 | 4/1985 | Miura et al. | 340/990 |
| 4,514,810 | 4/1985 | Ito et al. | 364/449 |
| 4,535,335 | 8/1985 | Tagami et al. | 340/988 |
| 4,660,037 | 4/1987 | Nakamura | 340/990 |
| 4,663,629 | 5/1987 | Tagami et al. | 340/988 |

*Primary Examiner*—Gary Chin
*Attorney, Agent, or Firm*—Lowe, Price, LeBlanc, Becker & Shur

[57] ABSTRACT

A navigation system includes a display control for controlling a display monitor on which a road map and a trace of the vehicle position are to be displayed. The navigation system also includes means for detecting when the vehicle reaches a known point on a preset route. The display control is responsive to detection of the vehicle reaching the known point to erase the displayed trace and set the vehicle position to that of the corresponding known point on the displayed map.

17 Claims, 13 Drawing Sheets

FIG. 1
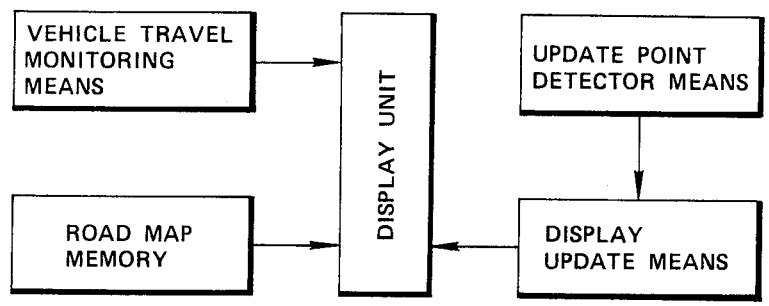
FIG. 3
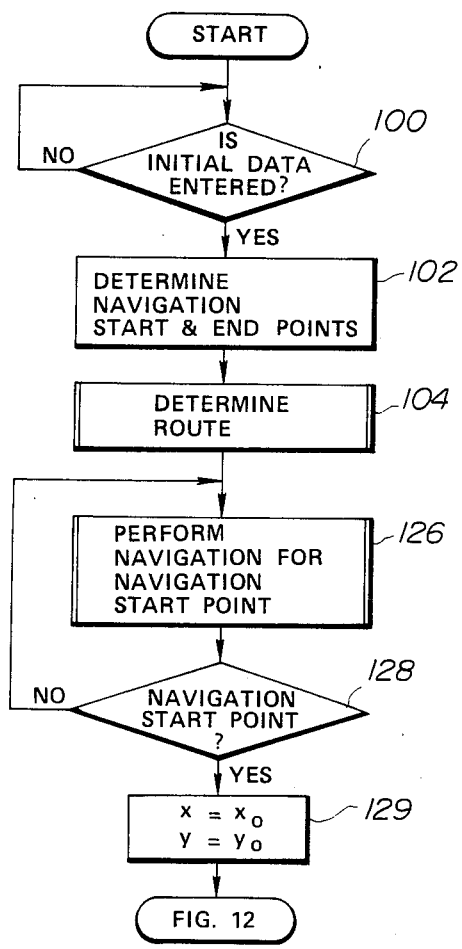
FIG. 4
```
BLOCK A 345
    A-1      345-020
    A-2      345-021
    A-3      345-022
    A-4      345-277
BLOCK B 346
    B-1      346-001
```

4,774,672

NAVIGATION SYSTEM FOR AUTOMOTIVE VEHICLE INCLUDING FEATURE OF UPDATING VEHICLE POSITION AT SELECTED POINTS ALONG PRESET COURSE

BACKGROUND OF THE INVENTION

The present invention relates generally to a navigation system for an automotive vehicle. More specifically, the invention relates to a navigation system with a graphic display on which a road map, the instantaneous position of the vehicle, and a projected course are displayed. In more detail, the invention relates to a system and method for precisely detecting vehicle position and renewing or updating the vehicle position data for accurate navigation.

Recently, various vehicular navigation systems including graphic map displays on a display, such as a CRT monitor, have been proposed. In all such prior proposed navigation systems, it has been considered essential to monitor vehicle position and update the vehicle position data from time to time as the vehicle travels. Various sensors have been employed to detect the vehicle position.

A typical sensor for detecting vehicle position is the combination of a distance sensor which monitors distance travelled by the vehicle and a direction sensor for monitoring the direction of travel of the vehicle. However, with the sensors available nowadays, it is still difficult to precisely detect instantaneous vehicle position and there thus tends to be a certain amount of error. This error tends to accumulate as the distance covered by the vehicle increases. The accumulated error may become significant in cases where the travel distance is relatively long. Due to these accumulated errors, conventional navigation systems have not been adequately reliable for practical use.

On the other hand, when such vehicle position sensors are utilized to monitor relatively short travel distances the error in the resultant vehicle position data is rather small and can be disregarded. Therefore, over relatively short distances, the vehicle position sensors are practical for navigation. Therefore, if the initial position of the vehicle can be renewed or updated accurately at relatively short intervals of vehicle travel, precise navigation would be possible.

Furthermore, when a symbol representing vehicle position is superimposed on the road map displayed on the display monitor, the symbol tends to be misplaced due to errors in the distance sensor and/or the direction sensor signals. As such errors accumulate, the vehicle symbol on the display screen becomes farther and farther off course.

SUMMARY OF THE INVENTION

Therefore, it is an object of the present invention to provide a navigation system for a vehicle which includes a display monitor displaying a road map and a vehicle position symbol which is acceptably precise.

In order to accomplish the aforementioned and other objects, a navigation system, according to the present invention, includes a display control controlling a display monitor on which a road map and a symbol representing vehicle position are to be displayed. The navigation system also includes means for detecting when the vehicle reaches each of a series of known, preselected points defining a preset route. The display control erases the displayed symbol and redraws the vehicle position symbol at the current known point on the displayed map as the vehicle reaches each known point.

In accordance with one aspect of the invention, a navigation system for an automotive vehicle comprises first means for monitoring vehicle motion and deriving first data indicative of vehicle position, second means for monitoring the direction of travel of the vehicle and deriving second data indicative of the vehicle travel direction, third means for storing a map which includes a plurality of known points, fourth means allowing selection of a route for the vehicle and storing the selected routine, the fourth means storing third data indicative of designated known points along the route and a predetermined condition for detecting when the vehicle reaches each of the designated known points, fifth means for displaying the map stored in the third means, and a symbol representing the vehicle position and a trace of vehicle travel on the map, and sixth means for setting a travel zone between successive designated known points and displaying instantaneous position of the vehicle, the sixth means monitoring vehicle position within the travel zone, detecting when the predetermined condition is satisfied and in such cases, renewing the travel zone, erasing the trace of vehicle travel and redrawing the symbol of the vehicle position at the designated known point.

Preferably, the sixth means detects the approach of the vehicle to the next designated known point on the basis of the first data, detects when the distance from the vehicle position to the next designated known point is less than a given distance, thus defining an area centered at the next designated known point, detects when the vehicle enters the defined area and checks the second data against a given direction so as to detect when the vehicle travel direction matches the given direction, thereby detecting when the predetermined condition is satisfied, and that the vehicle has reached the next designated known point.

In the alternative, the sixth means derives a distance of travel from a starting designated known point, detects the approach of the vehicle to the next designated known point on the basis of the first data, and detects when the distance from the vehicle position to the next designated known point is less than a given distance, thereby defining an area centered at the next designated known point, detects when the vehicle enters the defined area and compares the derived travel distance with the known distance between the designated known points, thereby detecting when the predetermined condition is satisfied, and thereby detecting that the vehicle has reached the next designated known point.

The fourth means stores data indicative of the vehicle travel direction while approaching the next designated known point and the vehicle travel direction leaving the next designated known point, and derives the fourth data so as to represent a direction intermediate the stored directions. The first means replaces the first data indicative of the vehicle position with position data for the next designated known point when the sixth means detects that the vehicle has reached the next designated known point.

The first means replaces the first data with the position data of the next designated known point when the travel distance derived by the sixth means matches the known distance between the two designated points at least within the set area, in cases where the vehicle directions approaching and leaving the next designated known point are approximately equal.

In practice, the sixth means defines the defined area as a circular area of variable radius related to the error value when the approaching direction and leaving direction are different, and as an elongated area with its minor axis parallel lto the vehicle travel direction, and its major axis perpendicular to the vehicle travel direction.

Alternatively, the first means replaces the first data with the position data of the next designated known point when the vehicle travel distance from the former designated known point is less than the known distance between the two designated known points when the vehicle exits the distal side of the elongated area.

According to another aspect of the invention, a process for navigation of a vehicle along a preset route comprising the steps of:

providing a road map with data for a plurality of known points along a route;

displaying the road map on a visual display screen;

presetting a route across the map and designating known points along the preset route;

defining a travel zone between a first starting designated known point and a second designated known point along the route;

monitoring vehicle travel distance with the travel zone and detecting when the vehicle approaches to within a first given area of the second designated known position;

displaying a symbol indicative of the instantaneous vehicle position and a trace of vehicle position through the travel zone;

monitoring vehicle behavior within the second given area for comparison with a predetermined criterion for detecting when the vehicle coincides with the second designated known point;

shifting vehicle position indicative symbol to the designated known point on the display and erasing the vehicle trace; and redefining the travel zone by taking the second designated known point which currently coincides with the vehicle as the first designated known point and selecting a neighboring designated known point as the second designated known point.

In the preferred process, it includes a step of detecting when the vehicle coincides with the second given area by monitoring vehicle driving direction and comparing the vehicle driving direction with a known direction.

The known direction is derived from a known first vehicle travelling direction assumed by a vehicle approaching the second designated known point and a known second vehicle travelling direction assumed by a vehicle leaving the second designated known point. The known direction is the bisector of the angle subtended by the azimuth vectors of the first and second direction of travel.

In the preferred process, the vehicle coincidence with the second designated known point is detected by comparing the vehicle travel distance within the second distance area with the known distance between the first and second designated known points and detecting when the travel distance matches the known distance.

The position data of the vehicle is updated with the known position data of the second designated known point each time the travelling zone is redefined.

BRIEF DESCRIPTION OF THE DRAWINGS

In the drawings:

FIG. 1 is a schematic block diagram showing the principle features of a navigation system according to the present invention;

FIG. 3 is a flowchart for initialization of navigation in the preferred embodiment of the navigation system of FIG. 2;

FIG. 4 shows an example of a displayed map index;

DESCRIPTION OF THE PREFERRED EMBODIMENTS

Figure 2:
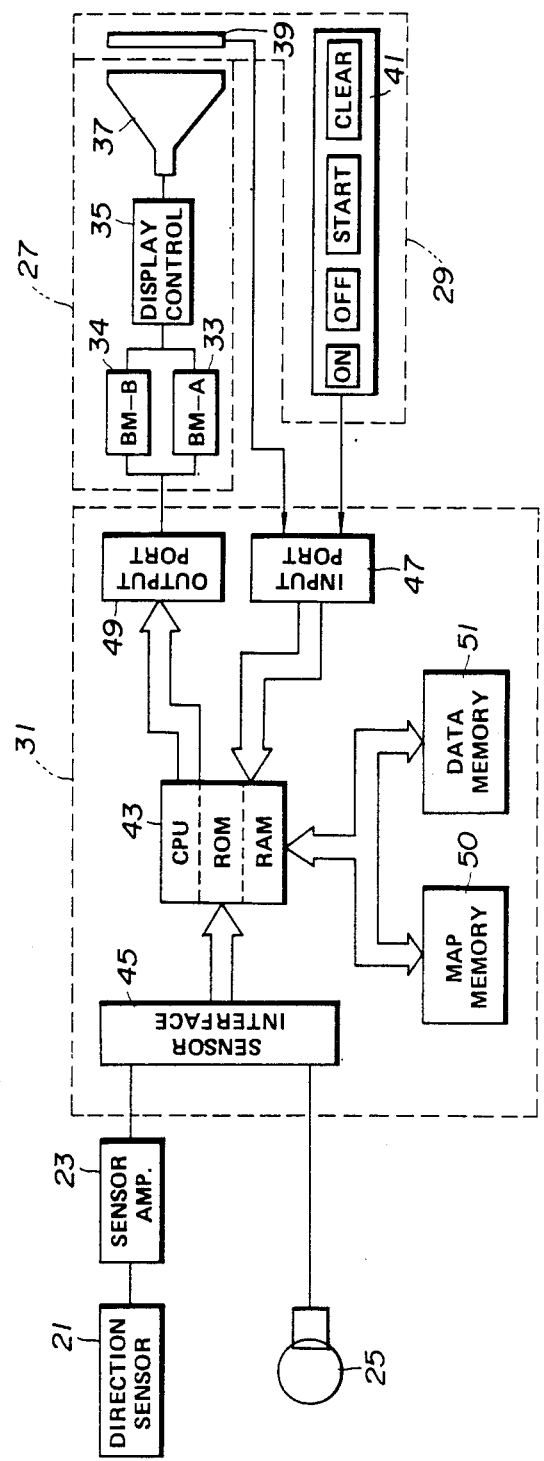
FIG. 2 is a block diagram of the preferred embodiment of the navigation system according to the present invention.

Referring now to the drawings, particularly to FIG. 1, the general concepts of a navigation system according to the present invention will be disclosed in order to facilitate better understanding of the detailed description of the preferred embodiment of the navigation system which will be described with reference to FIGS. 2 to 24.

It should be noted that the term "updating point" or "update point" used throughout the disclosure means preset target points of known position along a route to a given destination and the coordinates of which are stored in memory. Intersections, major curves and so forth may be selected for use as target points. Also, the term "travel zone" represents a zone or section in the preset route between update points. The first of the two update points defining the travel zone, i.e. the one from which the vehicle starts, will be referred to as "first update point". The other update point will be hereafter referred to as "second update point". The update point or target point subsequent to the second update point will be hereafter referred to as "third update point" or "third target point". Furthermore, the term "update zone" represents an area or zone around the second update point defined for use in monitoring when vehicle passes the second update point.

In FIG. 1, the navigation system according to the present invention includes a monitoring means for monitoring vehicle travel. In practice, the vehicle travel monitoring means derives instantaneous vehicle position, travel distance and travel direction. The instantaneous position derived by the vehicle travel monitoring means is in terms of x- and y-coordinates in a road map coordinate system. The travel distance is updated whenever the vehicle starts travel in a new travel zone. Therefore, the travel distance derived by the vehicle travel monitoring means is always the distance travelled by the vehicle from the starting update point. In the navigation system according to the invention, the travel direction is monitored by a magnetic compass or the like.

The navigation system also has a road map memory storing road map data including the coordinates of target points. The vehicle travel monitoring means and the road map memory are connected to an image display means including a display unit with a display monitor on which a road map is displayed. A symbol representing the vehicle position is also displayed and moves according to the monitored vehicle travel. The image display means also displays navigation guide information intended to aid compliance to a preset route.

In order to update the travel zone and update data, the navigation system according to the invention also has a detector which detects when the vehicle reaches the second update point. The update point detector means is associated with an updating means which updates the vehicle symbol position on the road map by moving the symbol to the second update point when the vehicle reaches the second update point.

By renewing the travel zone eachtime the vehicle reaches a second update point errors in travel distance measurement and monitoring of the travel direction can be corrected. Also, updating the vehicle symbol position on the road map displayed on the display monitor keeps the vehicle position symbol accurate.

The preferred embodiment of the navigation system according to the present invention will be disclosed hereafter with reference to FIGS. 2 to 5.

FIG. 2 shows the preferred embodiment of the navigation system for implementing a method for detecting update points along a preset vehicle route.

The navigation system includes a vehicle direction of travel sensor 21 which may comprise a magnetic compass, for example. The preferred construction of the magnetic compass is as disclosed in SAE paper SP-80/458/S02.05, published by the Society of Automotive Engineering, No. 800123 by H. Ito et al. or 3-axis Rate Gyro Package Parts No. PG24-N1, of Kabushiki Kaisha Hakushin Denki Seisakusho, February, 1979. Also, a suitable magnetic compass is disclosed in British Patent First Publication No. 2,102,259, published on Jan. 26, 1983, which corresponds to German Patent First Publication No. 32 17 880, published on Nov. 25, 1982, British Patent First Publication No. 2,100,001, published on Dec. 15, 1982, which corresponds to German Patent First Publication No. 32 13 630, published on Nov. 18, 1982, and German Patent First Publication No. 33 05 054, published on Aug. 25, 1983. The contents of the above-identified publications are hereby incorporated for the sake of disclosure.

A travel distance sensor 25 monitors vehicular wheel rotation in order to monitor the distance travelled. The travel distance sensor 25 produces a travel distance indicative pulse with every predetermined number of wheel rotations.

The direction of travel sensor 21 is connected to a processing unit 31 via a sensor amplifier 23 which amplifies the direction of travel indicative sensor signal produced by the travel direction sensor, and a sensor interface 45 in the processing unit. The travel distance sensor 25 is also connected to the processing unit 31 via the sensor interface 45. The processing unit 31 has an output port 49 connected to a display unit 27 which includes buffer memories 33 and 34, a display controller 35 and a display device 37 which may be a CRT monitor, for example. The processing unit 31 also has an input port 47 connected to an input unit 29 including a key-switch array 41 and a transparent touch panel 39 which comprises a plurality of pressure responsive segments or thermo-responsive segments which accepts inputs by way of touching different points on the display screen. The touch panel 39 overlies the map displayed on the display screen to allow convenient input of position data. The function of the touch panel 39 can be imagined as being equivalent to the conventional light pen.

The processing unit 31 comprises a microprocessor made up of the aforementioned sensor interface 45, an input port 46, the output port 49, and in addition, built-in CPU, ROM and RAM units. A monolithic processing unit constructed as set forth above may serve as the microprocessor for ease of installation in the vehicular space. The processing unit 31 also includes a map memory 50 which stores map data for various locations. In order to store an adequately large volume of map data, the map memory 50 may be an external memory with a large-capacity storage medium, such as a read-only compact disk (CD). The processor unit 31 further includes a temporary data memory 51 for storing data concerning the preset route including position data, intersection configuration data and so forth for the preset update points.

The contents of the map memory has been discussed in German Patent First Publication No. 35 10 481. The contents of the above-identified German Patent First Publication are hereby incorporated by reference for the sake of disclosure. In brief, the map memory has a large number of memory blocks divided into groupes of pages, each of which represents a large map area. Each page is further divided into a plurality of blocks representing smaller areas which may correspond to a single frame of the display screen. Each group of memory blocks storing the data for the corresponding map block further includes a plurality of additional memory blocks storing data about specific feature, such as intersections, major curves and so forth. The contents of the additional memory blocks may include identification of specific features, neighboring features intersection configurations, size information and so forth. The map memory 50 also has an index of map areas and map blocks. This index can be displayed on the display screen 37.

Practical operation of the preferred embodiment of the navigation system of FIG. 2 will be described in detail with reference to FIGS. 3 to 24.

The navigation system becomes active in response to closure of a power supply switch. After the power comes on, the system enters a stand-by state in which it awaits entry of data. Therefore, a step 100 checks for data entry, as shown in FIG. 3. In general, data entry is mediated by the key-switch array 1 of the input unit 29. The data to be entered includes the starting point and the destination. The preferred embodiment of the navigation system can accept the initial data for the starting position and the destination in either of two modes, referred to as "precise data entry" and "rough data entry". Both modes of data entry will be described hereinafter.

Precise Data Entry

Precise data entry may be performed by pointing the precise starting point and destination on the road map display. In this case, the map block or blocks including the starting point and the destination are selected by entering identification codes thereof through the key-switch array 1 of the input unit 29. Upon entry of the identification code, the road map block in the map memory 50 is read out and displayed on the display screen. The starting point and the destination on the displayed map can be pointed out by means of the touch panel 39. The touch panel 39 produces a position signal representing x- and y-coordinates of the point touched on the displayed map. The position signal is decoded and stored as the coordinates of the starting point and the destination.

Rough Data Entry

Rough data entry does not require the exact position of the starting point and the destination to be pointed out. When rough data entry is desired, an index of individual unit areas of the road map are displayed on the display screen, in the manner shown in FIG. 4. As shown in FIG. 4, the index includes the names and codes of map divisions and the names and codes of individual unit areas included in the corresponding division. With reference to the displayed index, the identification code of the individual unit areas of the starting point and the destination are input through the key switch array 1 of the input unit.

The step 100 in the initialization program of FIG. 3 is repeated until all the above data entry has been performed. Thereafter, target points to be taken as navigation start and end points are determined, at a step 102. The navigation start and end points are determined in the following manner.

As to the starting point, when the starting point data is entered by precise data entry, the entered x- and y-coordinates $(x_s, $ and $y_s)$ of the starting point $Z_s$ are used in determining the navigation start point.

On the other hand, when the starting point data is entered by the rough data entry, the starting point is assumed to be the center of the selected individual unit area.

Figure 5:
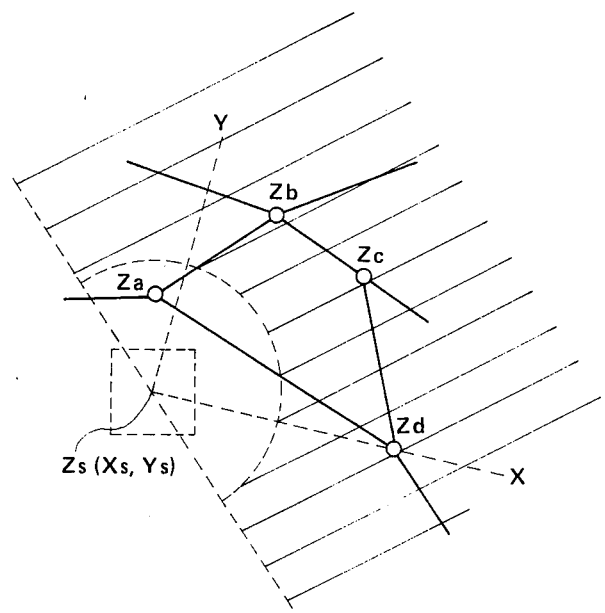
FIGS. 5 and 6 are diagrams illustrating how the vehicle route is selected.

In this case, the navigation start point is set to one of the target points nearest the assumed starting point but outside the individual unit area. As shown in FIG. 5, given the starting point $Z_s(x_s, y_s)$, and destination $(x_d, y_d)$, the adjoining target points $Z_a$, $Z_b$, $Z_c$ and $Z_d$ are checked. Since the actual starting point is not known from the rough data entered, the navigation start point is preferably set to the target point nearest the assumed center along the desired route, which therefore satisfies the following expressions:

$$ABS\left(\frac{(y_0 - y_s) - \tan\Delta(x_0 - x_s)}{\tan\Delta(y_0 - y_s) + (x_0 - x_s)}\right) \geq \frac{y - y_s}{x - x_s}$$

$$(x - x_s)^2 + (y - y_s)^2 \leq A^2$$

where A is a predetermined range of, say, 3000 m, assuming that each individual unit area is 1 km$^2$, and $\Delta$ is a predetermined angular limit of, say, 22.5°. If a plurality of target points satisfies the foregoing conditions, the closest one is selected as the navigation start point.

Figure 6:
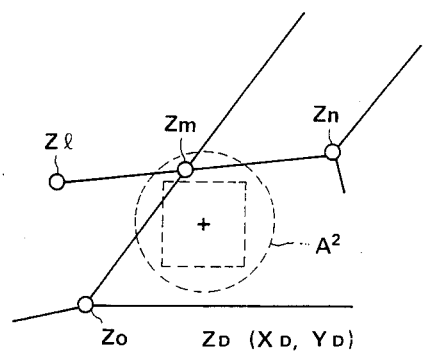

Similarly, when the precise data entry is performed for the destination, the entered destination position is used directly to find the destination point and the navigation end point. On the other hand, when the destination data is provided by rough data entry, the destination is assumed to be the center of the designated individual unit area. In the latter case, the navigation end point is selected in substantially the same manner as described above for determining the navigation start point. Specifically, as shown in FIG. 6, assuming the point $Z_D(x_D, y_D)$ to be the destination, the closest target point $Z_o$, $Z_1$, $Z_m$ or $Z_n$, which is outside of the individual unit area, satisfying the expression:

$$(x-x_D)+(y-y_D) \leq A^2$$

is selected for use as the navigation end point. In the case of precise data entry, the restriction to points outside the individual unit area is lifted.

Figure 7:
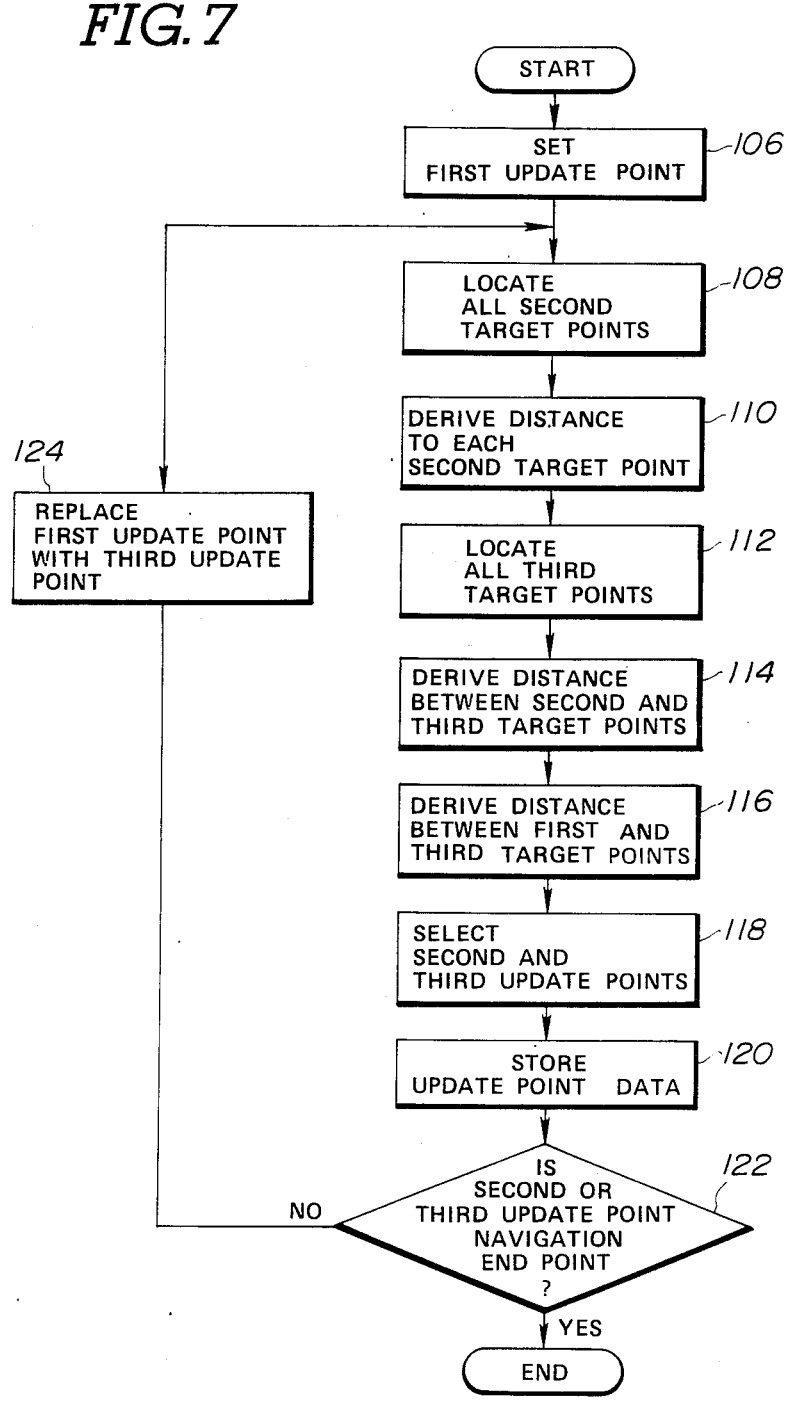
FIG. 7 is a flowchart of a sub-routine for selecting the vehicle travel route.

The coordinates of the navigation start and end points are stored for later use. After completing the process in the step 102, a sub-routine for determining the travel route is performed at a step 104. The sub-routine is shown in FIG. 7. In the sub-routine of FIG. 7, all of the target points to be used as updating points are determined one-by-one so as to find the shortest possible route.

At the first cycle of sub-routine execution, the navigation start point determined at the step 102 is taken as the first update point at a step 106. Then, all of the adjoining target points around the first update point are found and checked at a step 108. Based on the known positions of these target points, the distance to each target point is calculated at a step 110. The resultant distance values are temporarily stored. After this, the target points adjoining each of the second target points uncovered in the step 108 and located at a step 112. The distances between the second and these third target points are calculated at a step 114. Thereafter, the distances between the first update and the third target points are calculated at a step 116. The smallest of the resultant distance values obtained at the step 116 is selected so that the target points along the shortest route are selected as the second and third update points, at a step 118. The position data of the determined second and third update points are stored in the data memory 51 at a step 120. Then, the second and third update points determined in the preceding steps are checked against the navigation end point to see whether either of the second or third update point determined at the step 118 is the navigation end point. If NO, process control passes to a step 124 in which the third update point is taken as the first update point for the next cycle of execution of the steps 108 to 122. On the other hand, if one of the second and third update points is the navigation end point, control returns to the routine of FIG. 3.

Therefore, by repeating the steps 108 to 124, all of the update points along the route are found and recorded in the data memory 51.

Figure 10:
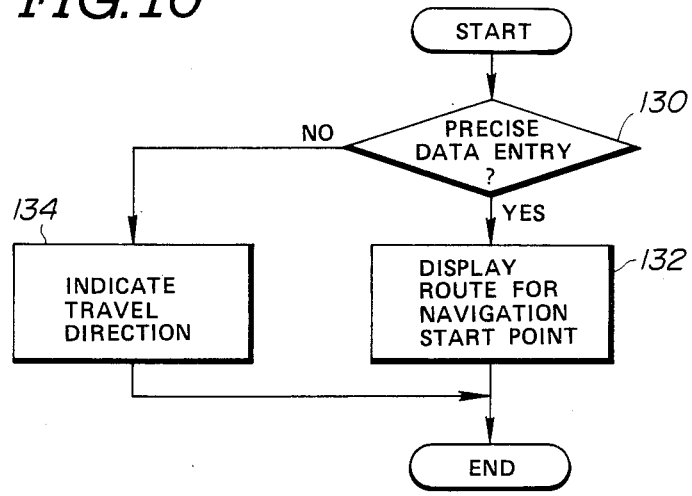
FIG. 10 is a flowchart of the process of navigation to the navigation start point.

After completing the sub-routine of FIG. 7, navigational guidance to the navigation start point is provided by the sub-routine illustrated in FIG. 10. During vehicle travel, travel distance $\int \Delta D$ and instantaneous vehicle position are derived and updated periodically. In practice, the travel distance and the instantaneous vehicle position is update after every given distance of vehicle travel. As stated previously, the vehicle travel distance is monitored by the travel distance sensor 25 which produces the travel distance indicative pulse per given unit distance of travel of the vehicle. Therefore, by counting the vehicle travel distance indicative pulses from the travel distance sensor 25, the travel distance can be monitored. The vehicle travel distance $\int \Delta D$ and the instantaneous vehicle position (x, y) are derived by an interrupt routine shown in FIG. 11. As will be appreciated, the interrupt routine of FIG. 11 is triggered at every given distance $\Delta D$ of vehicle travel.

Figure 11:
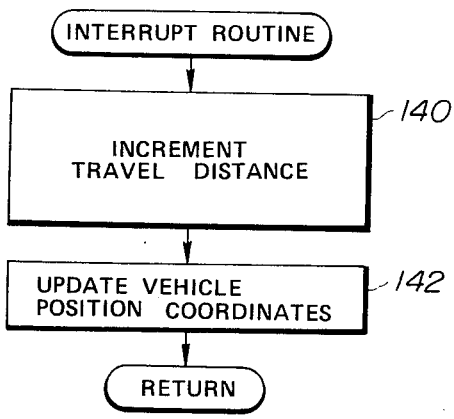
FIG. 11 is a flowchart of an interrupt routine for deriving vehicle travel distance and instantaneous vehicle position.

In the interrupt routine of FIG. 11, the travel distance $\int \Delta D$ is updated by adding $\Delta D$ to the existing value, at a step 140, and the direction of vehicle travel $\theta$ over the last unit of distance $\Delta D$ is read out. Then the distances travelled along the coordinate axes $\Delta x$ and $\Delta y$ from the first update point are updated according to the following equations:

$$\Delta x \rightarrow \Delta x + \Delta D \cos \theta$$

$$\Delta y \rightarrow \Delta y + \Delta D \sin \theta$$

The instantaneous vehicle position (x, y) is then derived from the following equations:

$$x = x_1 + \Delta x$$

$$y = y_1 + \Delta y$$

where $x_1$ and $y_1$ represent the coordinates of the first update point from which the vehicle travels to the second update point.

In the step 142, the vehicle symbol is moved to the point (x, y). Control then returns to the navigation program.

Figure 8:
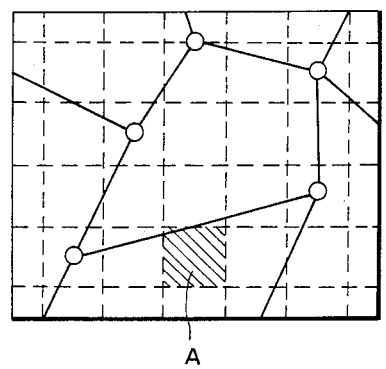
FIGS. 8 and 9 are exemplary displays for guiding the vehicle to the navigation start point.
Figure 9:
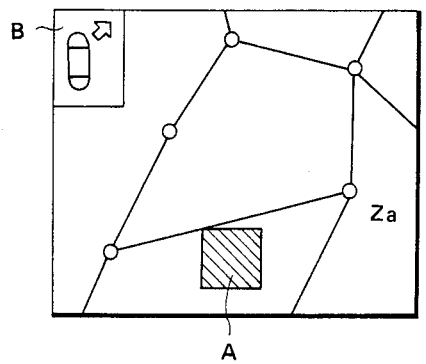

The sub-routine of FIG. 10 first checks whether input of the starting point was performed in precise data entry mode or the rough data entry mode, at a step 130. If the starting point was selected by means of the precise data entry mode, then normal navigation process starts. Thus, at a step 132, the appropriate block of the road map and the selected route are displayed on the display screen 37. On the other hand, if the starting point was selected by rough data entry, a larger-scale road map including the initial individual unit area is displayed on the display screen at a step 134 as shown in FIG. 8. Then, a directional guidance inset B is displayed in one corner of the display screen at a step 134. An arrow points in the suggested direction of travel to the navigation start point $Z_a$, as shown in FIG. 9.

After the step 132 or 134, control returns to the routine of FIG. 3. Immediately after returning from the sub-routine of FIG. 10, the vehicle position is checked to see if the vehicle has reached the navigation start point or not at a step 128. If the vehicle has not yet reached the navigation start point, control returns to the step 126 to re-execute the sub-routine of FIG. 10. On the other hand, once the vehicle reaches the navigation start point, the vehicle position coordinates are set equal to those of the navigation start point $(x_0, y_0)$ and a first travel zone is set up using the navigation start point as the first update point, at a step 129.

Figure 12:
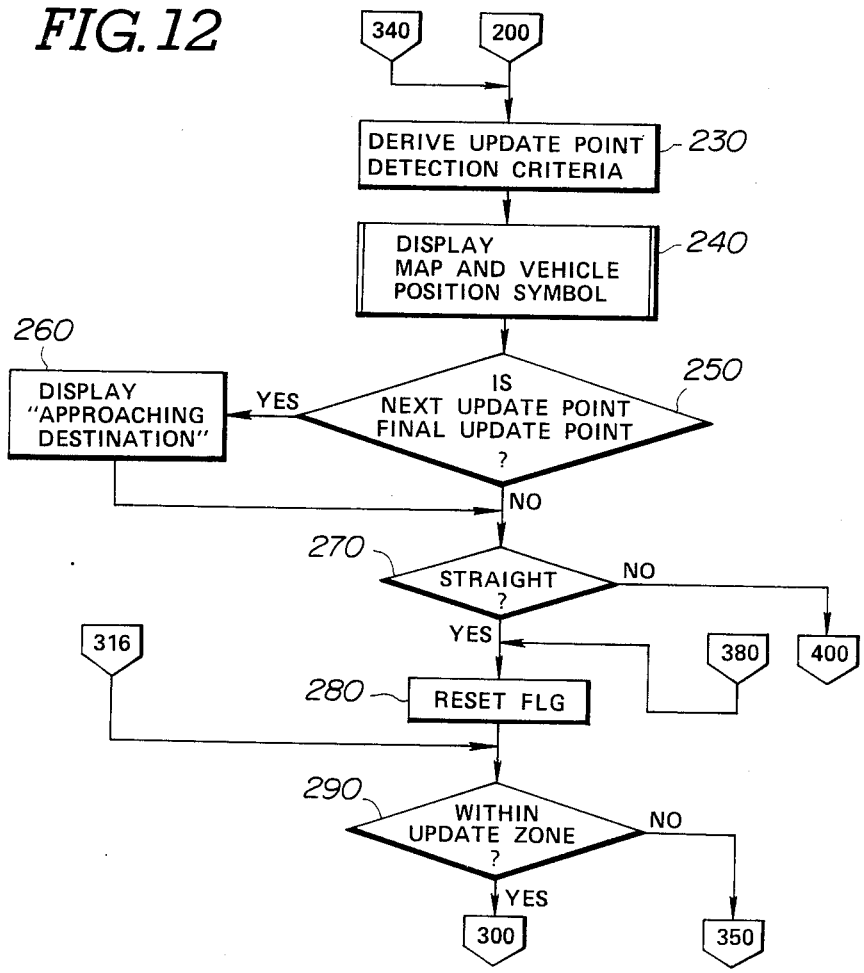
FIG. 12 is a flowchart of a program to be executed subsequently to the program of FIG. 3.
Figure 13:
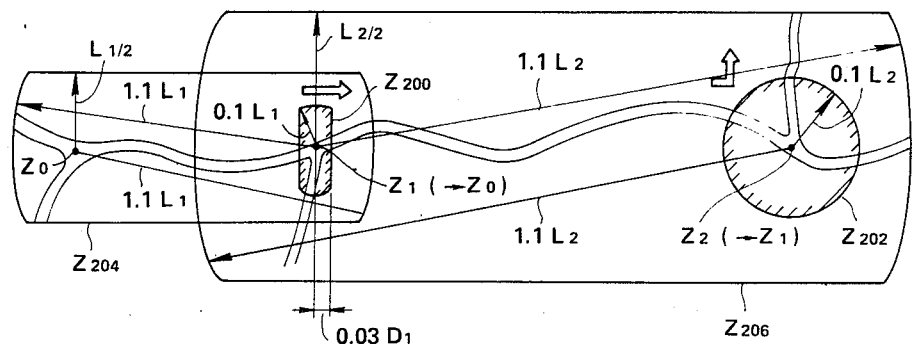
FIG. 13 is a diagram of update zones.
Figure 14:
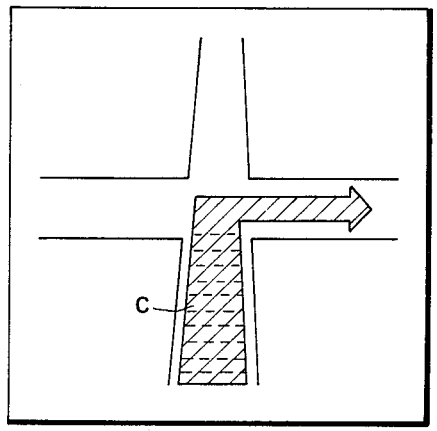
FIGS. 14 and 15 are exemplary displays during vehicle travel within an update zone.
Figure 15:
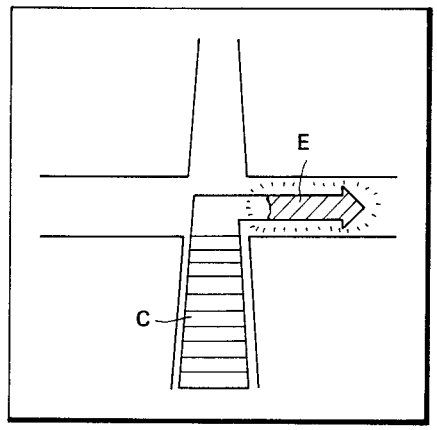

At subsequent step 230 in FIG. 12, an update zone which extends a given distance from the second update point $(x_1, y_1)$ is also derived, in a manner shown in FIG. 13. As shown in FIG. 13, the configuration of the update zone varies with the relationship between the entry direction $\theta_{in}$ and the exit direction $\theta_{out}$. For instance, when the preset route through the second update point is straight, the update zone around the second update zone is essentially an elongated rectangle with its major axis perpendicular to the axis of the preset route at the second update point, as represented by the reference numeral $Z_{200}$. On the other hand, when the preset route requires a turn or a change in travel direction at the second update point, the update zone will be a circle centered on the second update point, as represented by the reference numeral $Z_{202}$. The configuration of the update zone also varies with the distance D between the first and second update points.

The configuration of the rectangular update zone is defined by the intersection of a circle and an elongated rectangle, both centered on the second update point $(x_1, y_1)$. The radius of the circle about the second update point is 0.1D. The minor axis of the rectangular is 0.06D centered on the second update point and its major axis is longer than the radius of the circle. This figure is actually the geometric result of two criteria for recognizing that the vehicle position approximates coincides with the second update point, namely, (1) that the current detected vehicle position is within 0.1D of the second update point; and, (2) that the total travel distance $\int \Delta D$ is within $\pm 0.03D$ of the known distance between update points in question. Note that the relatively high accuracy of the travel distance is reflected in the 0.03D value and the relatively low directional accuracy is reflected in the 0.1D value.

On the other hand, if the update zone is of the circular form, the radius thereof is 0.1D about the second update point $(x_1, y_1)$.

An error zone $Z_{204}$ or $Z_{206}$ is also set up in step 230. The error zone is in the form of a rectangle extending from the first update point or the starting point to the next update point. In addition, the longitudinal ends of the rectangle are defined by circles of radius 1.1D centered on the two update points. The rectangle is 0.5D wide, so that the error zone covers a corridor 0.25D to either side of the line connecting the update points and extending about 0.1D past both update points. Note that this area covers the update zone completely. Furthermore, the route followed by the vehicle cannot deviate by more than 0.25D from the straight-line path- this imposes a need for extra preset update points on especially circuitous roads.

At a step 240, the map and the vehicle position symbol are displayed on the display screen 37 so as to renew the display for the next update point. Then, at a step 250, the program checks to see whether or not the next update point is the one closest to the destination. The update point closest to the destination will be referred to as the "final update point". If the next update point is the final update point, a message "APPROACHING DESTINATION" is displayed on the display screen 37. In either case, at a step 270, the preset route is checked to see if the vehicle is to pass straight through the update point rather than turning.

If the vehicle is to pass straight through the update point, a flag FLG is reset at a step 280. Otherwise control passes to a step 400 which will be discussed later. After the flag FLG is reset at the step 280, the programs checks to see if the vehicle is in the update zone, at a step 290. If the vehicle is in the update zone, control passes to a step 300; otherwise the program goes to a step 350.

Figure 16:
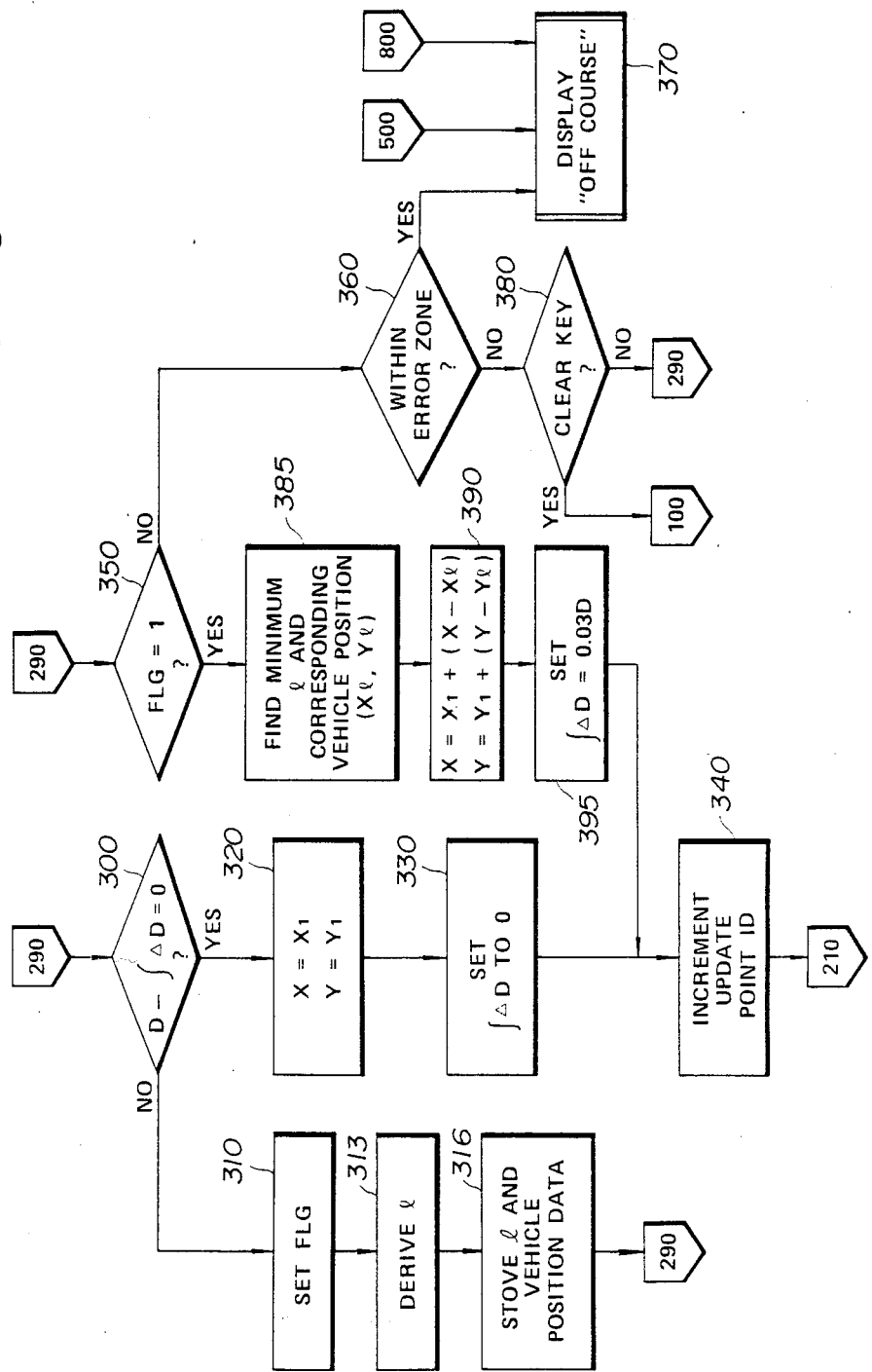
FIG. 16 is a flowchart of a program executed after the program of FIG. 12.
Figure 17:
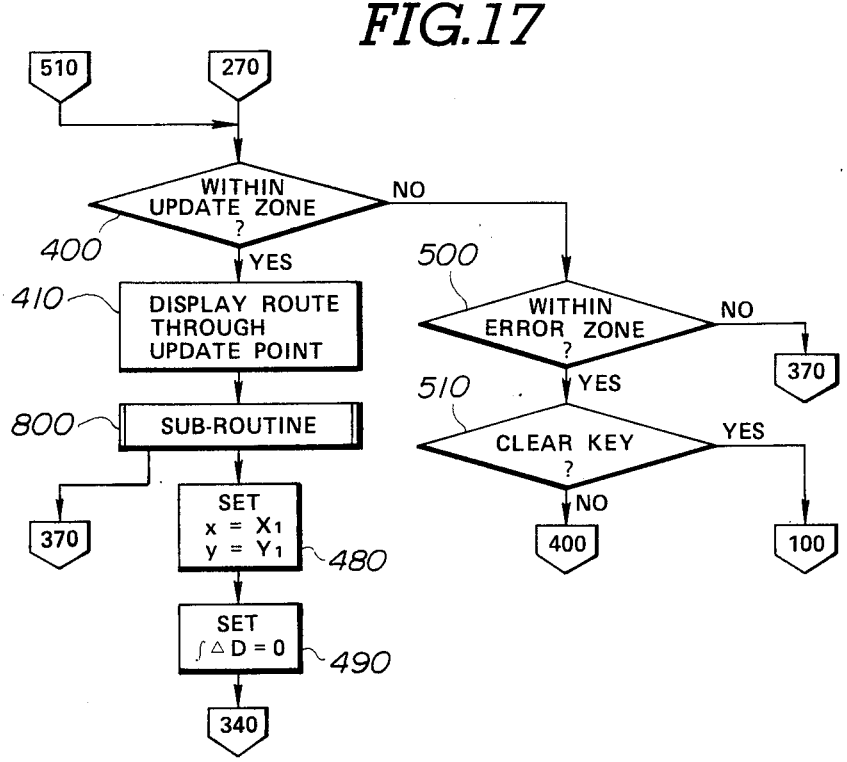
FIG. 17 is a flowchart of a program to be executed after the program of FIG. 16.
Figure 21:
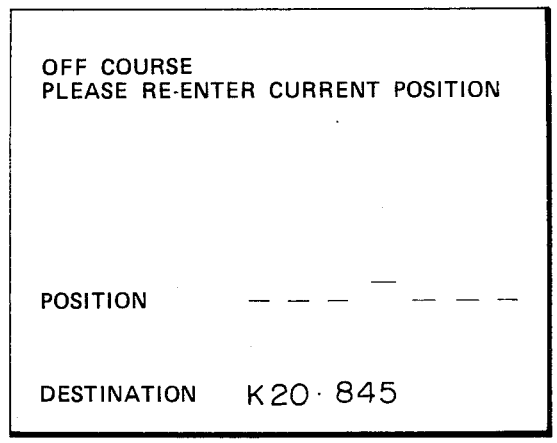
FIG. 21 is an illustration of a display generated at a step 1108 of FIG. 20.

At the step 300 in FIG. 16, the distance $\int \Delta D$ travelled since the last update point is compared with the known distance D between the two updating points. If the measured distance $\int \Delta D$ matches the known distance D, when checked at the step 300, control passes to a step 320 in which the vehicle position coordinates $(x_1, y_1)$ of the current update point. Thereafter, at a step 330, the travel distance $\int \Delta D$ between the update points is reset to zero. Then, data identifying the current pair of update points is updated so as to point to the next stretch of the preset route at a step 340. Thereafter, control returns to the step 230.

On the other hand, if the difference between the measured distance $\int \Delta D$ and the known distance D is other than zero at step 300, the flag FLG is set at a step 310. The distance l between the update point $(x_1, y_1)$ and the instantaneous vehicle position $(x, y)$ is derived according to the following formula, at a step 313:

$$l=(x-x_1)^2+(y-y_1)^2$$

At a step 316, the calculated distance l and the instantaneous vehicle position coordinates $(x, y)$ are stored for later reference. Then control returns to the step 290. The steps 290, 300, 310, 313 and 316 are repeated until the vehicle leaves the update zone or the difference between the calculated distance $\int \Delta D$ and the known distance D reaches zero when as checked at the step 300, i.e. until the vehicle reaches the update point.

If the vehicle is outside of the update zone at step 290, then the flag FLG is checked at a step 350. If the flag FLG is set, the stored data indicative of the distance l are checked to find the minimum value, i.e. the closest approach to the update point, at a step 385. At the step 385, the coordinates $(X_l, y_l)$ of the vehicle position at which the minimum distance l is obtained are read out. At steps 390 and 400, the vehicle position coordinates are adjusted to approximate the correct position. This adjustment is based on the assumptions that the closest approach $(x_l, y_l)$ was in fact the update point $(x_1, y_1)$ and that the vehicle is now 0.03D past the update point. The new coordinates are given by the following equations:

$$X=X_1+(X-X_s)$$

$$Y=Y_1+(Y-Y_s).$$

The travel distance value $\int \Delta D$ is set to 0.03D as an initial value in step 400, and then control passes to the step 340.

If the flag FLG is not set when checked at the step 350, the program checks to see whether the vehicle is in the error zone, at a step 360. If NO, i.e., if the vehicle is outside of the error zone, the message "OFF COURSE" is displayed on the display screen, at a step 370 and the program ends. On the other hand, if the vehicle is still within the error zone, the program checks the CLEAR key in the switch-key array 41, at a step 380. If the CLEAR key has been depressed at the step 380, control returns to the initializing step 100. Otherwise, control passes to the step 290.

If the vehicle is to change direction significantly (step 270), control passes to a step 400, which checks to see if the vehicle is in the update zone. If so, the planned route through the current update point is displayed graphically on the screen to aid the driver at this crucial point. The display image generated at the step 410 includes a number of indicator segments, each indicative of a given distance of vehicle travel arranged along the route in both entry and exit directions. After the step 410, one of the sub-routines as shown in FIGS. 18 and 19 is executed.

On the other hand, if the vehicle is not within the update zone when checked at the step 400, then the vehicle position is again checked to see if it is still within the error zone, at a step 500.

If the vehicle is outside of the error zone when checked at the step 500, the message "OFF COURSE" is displayed on the screen at the step 370. On the other hand, if the vehicle is within the error zone when checked at the step 500, then, the program checks whether the CLEAR key has been depressed or not, at a step 510. If the CLEAR key has been depressed, then control returns to the initialization step 100; otherwise control returns to the step 400.

Figure 18:
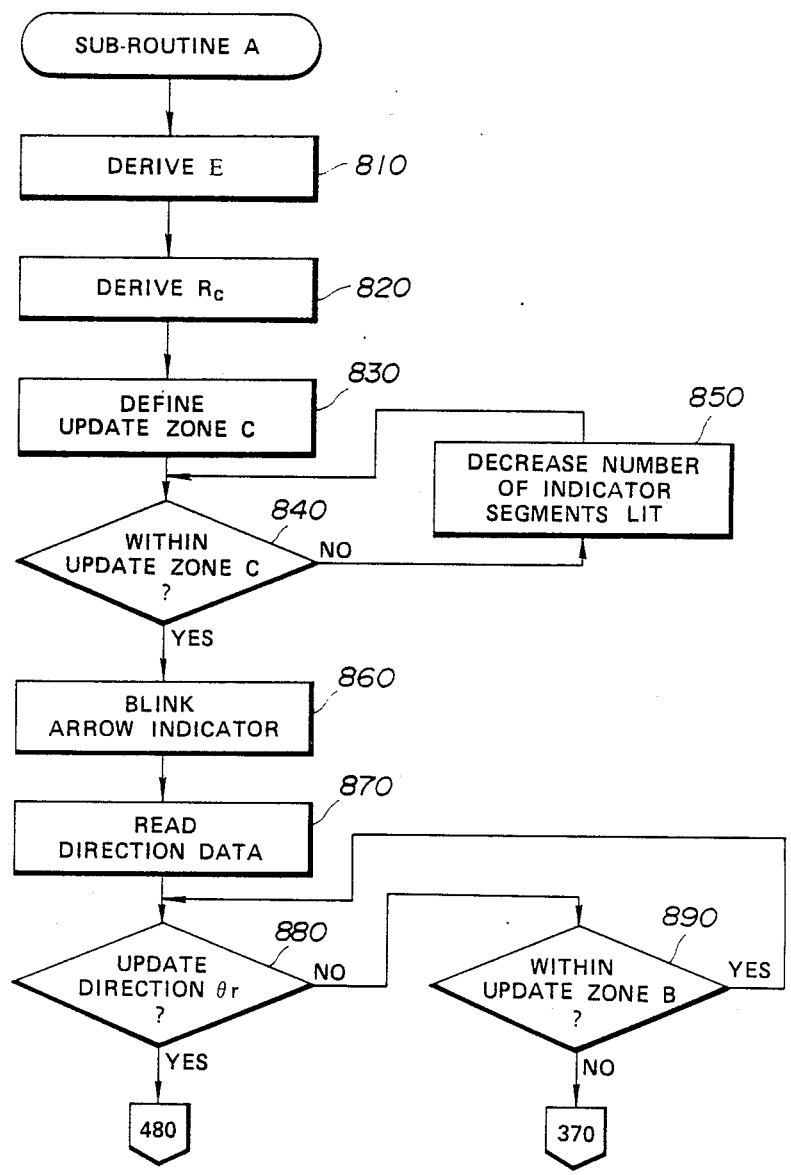
FIG. 18 is a flowchart of a sub-routine of the program of FIG. 17.
Figure 19:
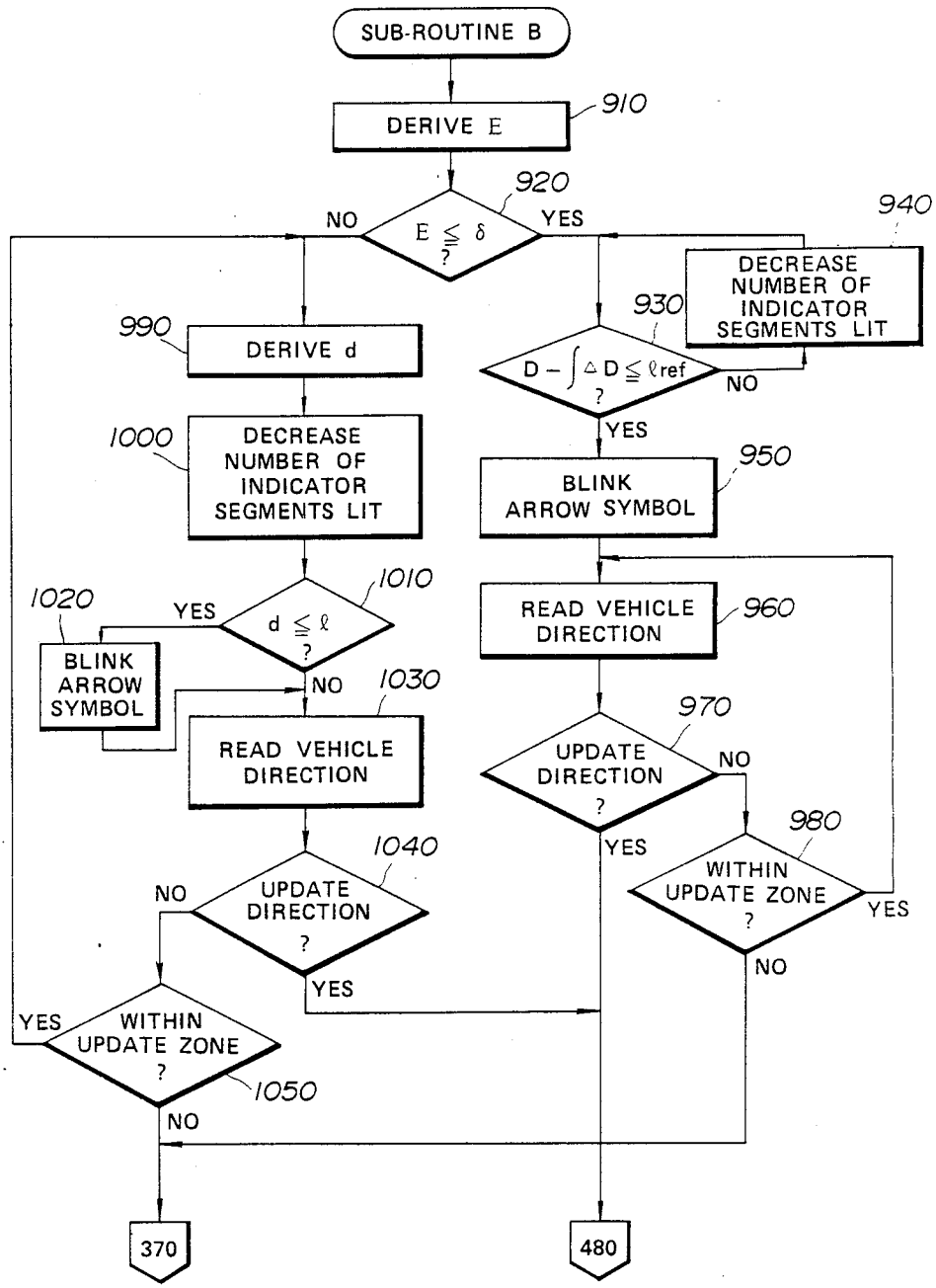
FIG. 19 is a flowchart of a modified sub-routine to be executed in the program of FIG. 18.

The sub-routine of FIG. 18 is triggered when the vehicle enters the circular update zone B. At a step 810, the difference between the measured travel distance $\int \Delta D$ and the known distance D between the update points is derived. The obtained diffrerence is subtracted from the radius 0.1D of the circular update zone, and the absolute value of this result is divided by the known distance value D to derive an error rate value $\epsilon$. This error rate $\epsilon$ is representative of the error between the known distance and the measured distance due possibly to errors in either the map data or in the measurement of the travel distance by the distance sensor 25. A small error rate means that the measured travel distance $\int \Delta D$ will tend to match the known distance D. On the other hand, a large error rate means that the travel distance value $\int \Delta D$ will differ significantly from the known distance.

As the error rate increases, the update zone, within which the vehicle driving direction is monitored and compared with the update direction in order to detect when the vehicle reaches the updating point, must widen so as to allow for greater error. Accordingly, a circular update zone C of variable radius is set up at a step 820. The radius of the update zone C is derived from the following formula:

$$R_C=\gamma \times \epsilon \times D$$

Therefore, when the error rate $\epsilon$ is small, the radius $R_c$ of the update zone C will also be small. On the other hand, when the error rate $\epsilon$ is large, so is the radius $R_c$ of the update zone C. The minimum and maximum radii of the update zone C are limited respectively to 100 m and 0.1D which corresponds to the radius of the fixed radius update zone set up in step 230. Using the radius $R_c$ determined at the step 820, the update zone C is defined to be centered on the update point $(x_1, y_1)$, at a step 830. After this, the vehicle position $(x, y)$ is checked at a step 840 to see if the vehicle is within the update zone C.

If the vehicle is outside of the update zone C when checked at the step 840, then distance indicator segments on the display screen 37 are turned OFF one-by-one at given intervals of vehicle travel at a step 850.

On the other hand, if the vehicle is in the update zone C when checked at the step 840, then arrow symbols uded as the distance indicator segments mentioned above start to blink at a step 860. Thereafter, the vehicle driving direction is read out at a step 870. The read vehicle direction of travel is compared with the update direction at a step 880. If the vehicle direction of travel does not match the update direction, the program, then checks to see if the vehicle is within the fixed-radius update zone at a step 890. If the vehicle is still within the fixed-radius update zone B, control returns to the step 880; otherwise, control returns to the step 370 set forth above.

Once the vehicle travel direction matches the update direction when checked at the step 880, the display on the display screen 37 is normalized at a step 885. Thereafter, the vehicle position data $(x_0, y_0)$ are replaced by the position data $(x_1, y_1)$ of the update point the vehicle just reached, at a step 480. Thereafter, the travel distance $\int \Delta D$ is reset to zero, at a step 490. Then, control returns to the step 340 to repeat the navigation process for the next preset update point.

FIG. 19 shows a modification to the sub-routine of FIG. 18. As in the sub-routine of FIG. 4, the error rate $\epsilon$ is derived at a step 910. The derived error rate $\epsilon$ is compared with a reference value $\delta$ at a step 920. If the error rate $\epsilon$ is equal to or less than the reference value $\delta$, the program goes to a step 930, in which the difference between the travel distance $\int \Delta D$ and the known distance D between the update points is compared with a predetermined distance value $l_{ref}$ at a step 930. If the difference $(D - \int \Delta D)$ is greater than the predetermined distance value $l_{ref}$, then the distance indicator segments are turned OFF one-by-one per unit of distance travelled by the vehicle in a step 940.

If the difference $(D - \int \Delta D)$ becomes equal to or less than the predetermined distance value $l_{ref}$, the arrow symbol serving as the distance indicator segment blinks at a step 950. Thereafter, the vehicle directiion of travel is read out at a step 960. The read direction of travel is compared with the update direction $\theta_r$ at a step 970. If the direction of travel does not match the update direction, a step 980 checks to see if the vehicle is within the fixed-radius update zone B. If the vehicle is still within the fixed-radius update zone, then control returns to the step 970; otherwise control returns to the step 370. On the other hand, if the direction of travel matches the update direction when checked at the step 970, the map display on the display screen 37 is normalized at a step 1045. Then, control passes to the step 480 of FIG. 4.

If the error rate $\epsilon$ is greater than the reference value $\delta$ when checked at the step 920, then the distance d between the vehicle position (x, y) and the update point $(x_1, y_1)$ is calculated at a step 990. At a step 1000, the distance indicator segments are turned OFF one-by-one for each given unit of vehicle travel. Then, the distance d derived at the step 990 is compared with the predetermined distance value $l_{ref}$, at a step 1010. If the distance d is equal to or less than the predetermined distance value $l_{ref}$, the arrow symbol blinks at a step 1020. Otherwise, the update direction $\theta_r$ is read out at a step 1030. The vehicle direction is compared with the updating direction in a step 1040, which is identical to step 970 except that control passes to step 1050 if the two directions do not match. Similarly, step 1050 is identical to step 980 except that control returns to step 990 if the vehicle is still within the fixed-radius update zone B.

Figure 20:
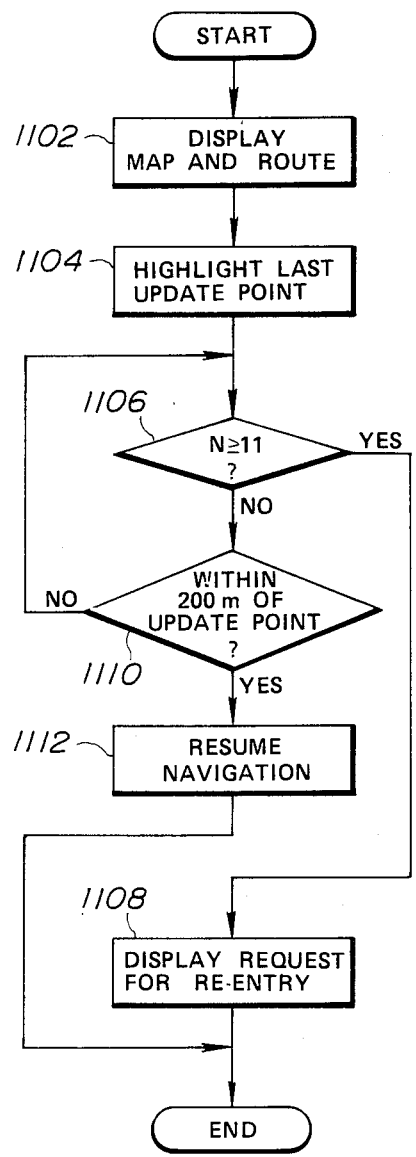
FIG. 20 is a flowchart of a program for guiding a vehicle back to a preset route triggered when of the vehicle is detected to be off course.

In the preferred embodiment, after the step 370, a routine shown in FIG. 20 is triggered to guide the vehicle back to the preset route. The routine of FIG. 20 first displays the preset route on the map at a step 1102. Thereafter, the update point through which the vehicle last passed before going off course is highlighted on the display at a step 1104. The symbol of the vehicle position will be simutaneously displayed on the display screen 37. Presumably, the vehicle is than driven back to the preset route. During this travel, the number of known target points through which the vehicle passes on the way back to the preset route is counted. This count N of target points is compared with a given value, e.g. 11, at a step 1106. If the count N is equal to or greater than the given value, control passes to a step 1108 in which the message "OFF COURSE, PLEASE REENTER CURRENT POSITION" is displayed to request reentry of the current vehicle position data, in the manner shown in FIG. 21. Then, the navigation program returns to the step 102.

On the other hand, as long as fewer than 11 target points have been passed, control passes to a step 1110. At step 1110, the distance from the current vehicle position to the last update point is checked. Once the vehicle approaches to within 200 m of the update point, for example, then normal navigation can resume from step 1112.

Figure 22:
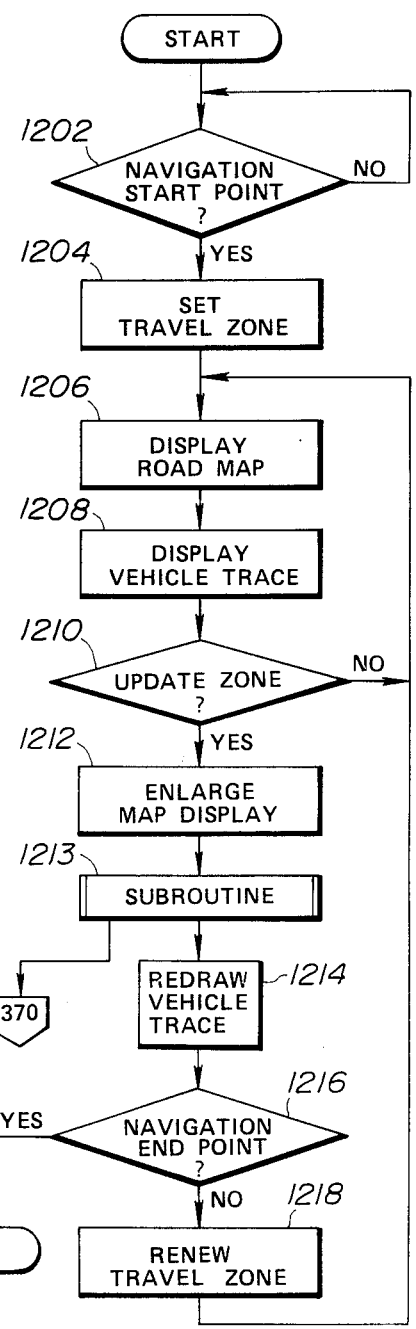
FIG. 22 is a flowchart of another initialization process.
Figure 23:
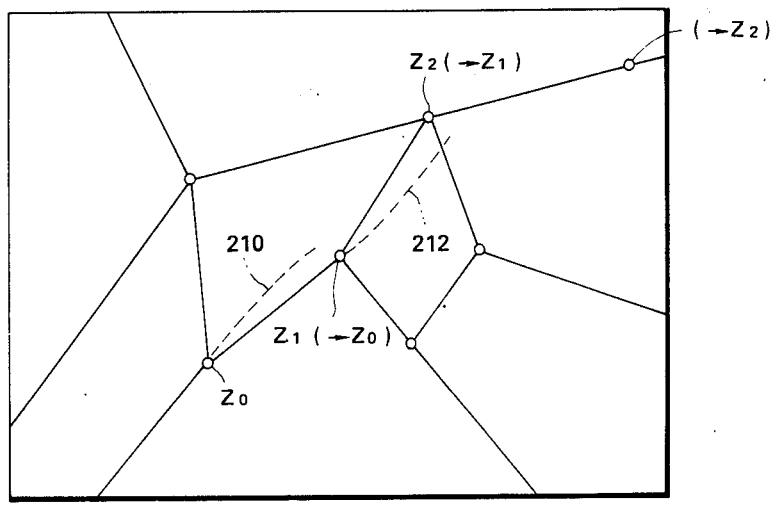
FIG. 23 is a diagram showing typical updates of the vehicle symbol on the display.
Figure 24:
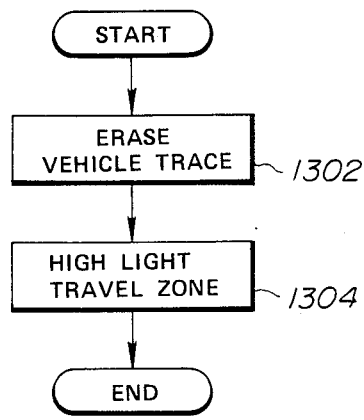
FIG. 24 is a flowchart of a program for updating the display.

FIGS. 22 to 24 show another embodiment of the navigation process to be implemented by the preferred navigation system. The process of guiding the vehicle to the navigation start point can be substantially the same as in the previous embodiments. Alternatively, navigation process can be triggered by depressing a START switch in the key-switch array 41 of the input unit 29. Then, the navigation start position is recognized to be the instantaneous position when the START switch is depressed at a step 1202. This is used to set up the first travel zone at a step 1204. Then, the road map display starts at a step 1206. A trace of the vehicle position since the last update point is superimposed on the displayed map at a step 1208. The current vehicle position is monitored in substantially the same way as disclosed with respect to the previous embodiments. Step 1210 checks to see if the vehicle has reached the update zone. If not, control returns to step 1206. Otherwise, the program moves to the larger-scale map display in step 1212 and then executes one of the subroutines of FIGS. 18 and 19, in a step 1213. Thereafter, once the vehicle reaches the update point, the vehicle position trace is redrawn between the two update points at a step 1214. The subsequent step 1216 checks to see if that update point was the navigation end point. If not, the travel zone is renewed by taking the second update point in the preceding travel zone as the new first update point at a step 1218.

As shown in FIG. 23, when moving to a new travel zone, the travel distance data $\int \Delta D$ is reset to zero or a given value e.g. 0.03D. At the same time, the vehicle trace on the display screen 37 is cleared and restarted from the update point $Z_1$. Thus, the vehicle position trace always starts from the first update zone of the current travel zone and is redrawn each time the vehicle reaches the second update point of the current travel zone.

FIG. 24, shows the step 1214, in which the vehicle trace is redrawn on the display screen 37, in more detail. First, at a step 1302, the vehicle trace through the former travel zone is erased. Thereafter, the route from $Z_0$ to $Z_1$, i.e. the former travel zone, is highlighted as the vehicle trace through the former travel zone.

Therefore, the vehicle position and route can be accurately shown despite errors in measurements of the travel distance and travel direction.

Therefore, the present invention fulfills all of the objects and advantages sought therefor.

What is claimed is:

1. A navigation system for an automotive vehicle comprising:
    first means for monitoring vehicle motion and deriving first data indicative of vehicle position;
    second means for monitoring the direction of travel of the vehicle and driving second data indicative of the vehicle travel direction;
    third means for storing a map which includes a plurality of known points;
    fourth means for selecting a route for the vehicle and storing the selected routine, said fourth means storing third data indicative of designated known points along said route and a predetermined condition for detecting when the vehicle reaches each of said designated known points;
    fifth means for displaying said map stored in said third means, and a symbol representing the vehicle position and a trace of vehicle travel on said map; and
    sixth means for setting a travel zone between successive designated known points, said sixth means including display means for displaying an instantaneous position of said vehicle, said sixth means monitoring vehicle position within said travel zone, said sixth means further including detection means for detecting when said predetermined condition is satisfied and in response updating said travel zone by setting a new travel zone between said vehicle position and a subsequent next one of said successive designated known points, erasing said trace of vehicle travel and redrawing said symbol of the vehicle position at a next one of said successive designated known points.

2. A navigation system as set forth in claim 1, wherein said sixth means detection means detects the approach of the vehicle to the next designated known point on the basis of said first data, detects when the distance from said vehicle position to said next designated known point is less than a given distance, thus defining an area centered at said next designated known point, detects when the vehicle enters said defined area and checks said second data against a given direction so as to detect when the vehicle travel direction matches said given direction, and in response to detecting said vehicle entering said defined area and detecting said vehicle travel direction matches said given direction, detecting that said predetermined condition is satisfied, and that the vehicle has reached said next designated known point.

3. A navigation system as set forth in claim 1, wherein said sixth means derives a distance of travel from a starting designated known point, detects the approach of the vehicle to the next designated known point on the basis of said first data, and detects when the distance from said vehicle position to said next designated known point is less than a given distance, thereby defining an area centered at said next designated known point, detects when the vehicle enters said defined area and compares said derived travel distance with the known distance between said designated known points, and in response to detecting the vehicle entering said defined area and comparing said derived travel distance with the known distance, detecting that said predetermined condition is satisfied, and thereby detecting that the vehicle has reached said next designated known point.

4. A navigation system as set forth in claim 1, wherein said fourth means stores data indicative of the vehicle travel direction while approaching said next designated known point and the vehicle travel direction leaving said next designated known point, and derives said data indicative of the vehicle travel direction so as to represent a direction intermediate said stored directions.

5. A navigation system as set forth in claim 2, wherein said first means replaces said first data indicative of said vehicle position with position data for said next designated known point when said sixth means detects that the vehicle has reached said next designated known point.

6. A navigation system as set forth in claim 3, wherein said first means replaces said first data indicative of said vehicle position with position data for said next designated known point when said sixth means detects that the vehicle has reached said next designated known point.

7. A navigation system as set forth in claim 6, wherein said first means replaces said first data with the position data of said next designated known point when the travel distance derived by said sixth means matches the known distance between the designated known points at least within said defined area, in cases where the vehicle directions approaching and leaving said next designated known point are approximately equal.

8. A navigation system as set forth in claim 7, wherein said sixth means defines said defined area as a circular area of variable radius related to an error value when said approaching direction and leaving direction are different, and as an elongated area with a minor axis parallel to the vehicle travel direction, and a major axis perpendicular to said vehicle travel direction.

9. A navigation system as set forth in claim 8, wherein said first means replaces said first data with the position data of said next designated known point when the vehicle travel distance from said next designated known point is less than said known distance between said two designated known points when the vehicle exits the distal side of said elongated area.

10. A navigation system as set forth in claim 9, wherein said sixth means defines a new travel zone whenever said first data is replaced with the position data for said next designated known point.

11. A process for navigation of a vehicle along a preset route comprising the steps of:
    providing a road map with data for a plurality of known points along a route;
    displaying said road map on a visual display screen;
    presetting a route across said map and designating known points along the preset route;
    defining a travel zone between a first starting designated known point and a second designated known point along said route;
    monitoring vehicle travel distance within said travel zone and detecting when the vehicle approaches to within a first given area of said second designated known position;

displaying a symbol indicative of the instantaneous vehicle position and a trace of vehicle position through said travel zone;

monitoring vehicle position within a second given area for comparison with a predetermined criterion for detecting when the vehicle coincides with said second designated known point;

shifting vehicle position indicative symbol to said second designated known point on the display and erasing said vehicle trace; and redefining said travel zone by taking the second designated known point which currently coincides with said vehicle as said first designated known point and selecting a neighboring designated known point as said second designated known point.

12. The process as set forth in claim 11, which detects when the vehicle coincides with said second given area by monitoring vehicle driving direction and comparing said vehicle driving direction with a known direction.

13. The process as set forth in claim 12, wherein said known direction is derived from a known first vehicle travel direction assumed by a vehicle approaching said second designated known point and a known second vehicle travel direction assumed by a vehicle leaving said second designated known point.

14. The process as set forth in claim 13, wherein said known direction is the bisector of the angle subtended by the azimuth vectors of said known first and second direction of travel.

15. The process as set forth in claim 14, wherein a coincidence of said vehicle with said second designated known point is detected by comparing said vehicle travel distance within said second given area with the known distance between said first and second designated known points and detecting when the travel distance matches said known distance.

16. The process as set forth in claim 15, wherein a coincidence of said vehicle with said second designated known point is detected by monitoring vehicle position derived from said vehicle travel distance data and vehicle driving direction data and detecting when the vehicle reaches the distal border of said second given area.

17. The process as set forth in claim 16, wherein position data of the vehicle is updated with the known position data of said second designated known point each time said travel zone is redefined.

* * * * *